United States Patent
Prasse et al.

[15] 3,697,091
[45] Oct. 10, 1972

[54] PISTON RING FACINGS

[72] Inventors: Herbert F. Prasse, Town and Country; Harold E. McCormick, Ballwin, both of Mo.

[73] Assignee: Ramsey Corporation, St. Louis, Mo.

[22] Filed: May 11, 1970

[21] Appl. No.: 36,143

[52] U.S. Cl. ............................ 277/235 A, 29/156.5
[51] Int. Cl. ........................................... F16j 9/12
[58] Field of Search ..117/105.2, 93.1; 277/216, 223, 277/224, 235 R, 235 A; 29/156.6

[56] References Cited

UNITED STATES PATENTS

| | | | |
|---|---|---|---|
| 3,310,423 | 3/1967 | Ingram | 117/105.2 |
| 3,539,192 | 11/1970 | Prasse | 277/216 |
| 3,560,006 | 2/1971 | Watanabe | 277/224 |

*Primary Examiner*—Robert I. Smith
*Attorney*—Hill, Sherman, Meroni, Gross & Simpson

[57] ABSTRACT

This invention covers piston rings, including compression and oil control rings for internal combustion engine pistons, having a bearing face coated with a hard coating, particularly exhibiting good scuff-resistance comprising either a zirconium oxide base coating or a titanium oxide-aluminum oxide coating. The coating is preferably a plasma jet applied coating formed in situ on the bearing face.

4 Claims, 6 Drawing Figures

PATENTED OCT 10 1972  3,697,091
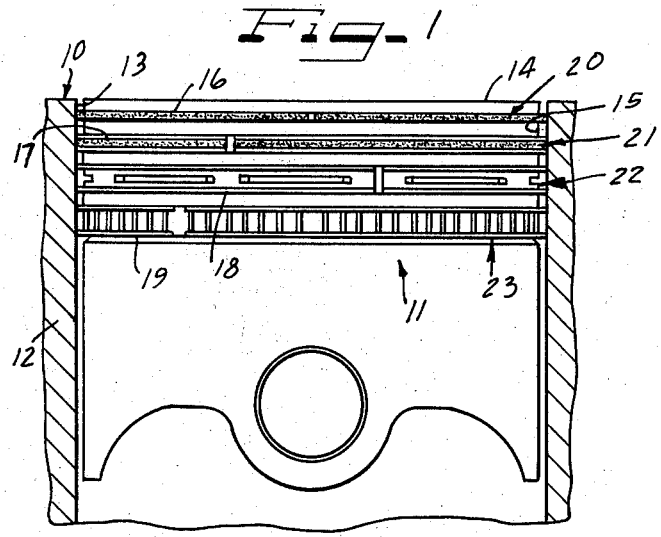
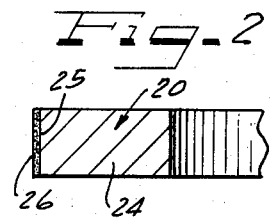
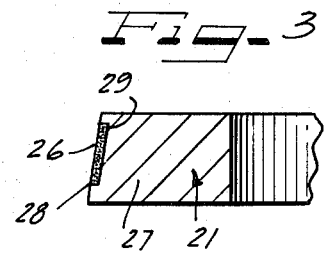
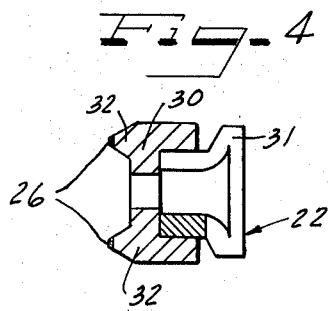
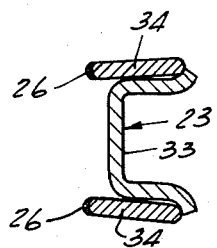
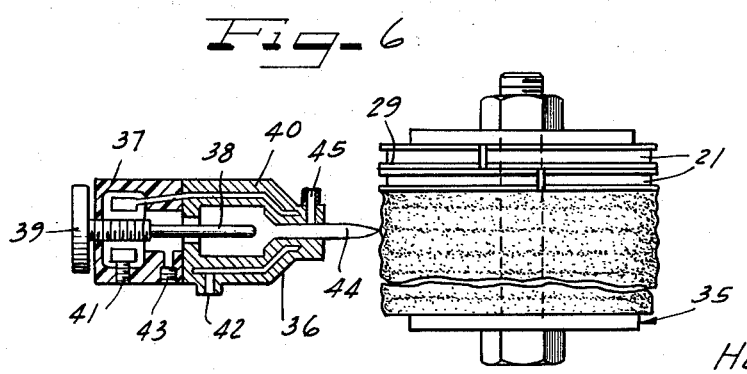
INVENTORS
HERBERT F. PRASSE
HAROLD E. McCORMICK
BY *Hill, Sherman, Meroni, Gross & Simpson* ATTORNEYS

PISTON RING FACINGS

BACKGROUND OF THE INVENTION

1. Field of the Invention

This invention pertains to the piston ring art and to the provision of bearing faces on piston rings. The invention particularly deals with plasma jet applied coatings and piston rings which exhibit the desired strength, wear-resistance and scuff-resistance.

2. Description of the Prior Art

It is known that piston rings, including compression rings and oil control rings, must be coated with a hard facing metal in order that they demonstrate long-lasting wear.

Suitable piston rings must also demonstrate other desirable properties for passable performance. For example, the coating must have a sufficiently high melting point and high particle hardness. In addition, the coating must be porous enough to allow it to carry a lubricant on the surface of the coating, thus imparting good scuff-resisting properties. Other properties which should be present include sufficient bond strength between the coating and the basic ring material, and a relatively low coefficient of expansion.

Two of the most important properties are sufficient hardness to exhibit proper wear and good scuff-resistance so that failure does not occur during the break-in period. However, while many prior art coatings for piston rings are sufficiently hard, they do not possess the property of the desired degree of scuff-resistance. In many cases, the converse is true.

It would therefore be of benefit to the art if a new class of piston ring coatings or facings were provided which exhibited all of the above properties, and particularly showed good wear characteristics coupled with sufficiently high scuff-resistance.

SUMMARY OF THE INVENTION

The present invention provides coated piston rings which show relatively low wear rates, coupled with the desired high degree of scuff-resistance. The rings of this invention have their bearing face coated with a hard coating exhibiting good scuff-resistance. The coating comprises either a zirconium oxide-base coating or a titanium oxide-aluminum oxide coating. These coatings are most preferably applied by means of a plasma jet spraying technique, whereby the coating is formed in situ on the bearing face. If desired, the piston ring bearing face may also contain an underlying bond coat which most preferably comprises a nickel-aluminide coating. Such underlying coat is particularly useful when the coated rings are used in heavy duty engines.

In accordance with a preferred embodiment of the invention, ferrous metal compression rings composed of conventionally cast nodular iron of about 3-12 percent carbon content by weight, thin rail rings for oil control assemblies composed of carbon steel such as S. A. E. 1070, and the like base metal rings, are coated with a plasma jet stream comprising either a powder composed of a combination of aluminum oxide and titanium oxide or a powder composed primarily of zirconium oxide. A preferred titania-alumina mixture includes from about 10 to about 25 percent by weight of titanium oxide and from about 75 to about 90 percent by weight of aluminum oxide.

The plasma jet utilizes a fuel gas preferably composed of a mixture of nitrogen or argon with or without hydrogen. The compression rings are preferably peripherally grooved and the groove is filled with an alloy resulting from the plasma jet application of the aluminum oxide-titanium oxide or zirconium oxide powder. The powder is vaporized and deposited in the ring groove as an in situ formed coating.

It is therefore an object of this invention to provide improved piston rings with hard-faced bearing surfaces exhibiting good wear and scuff-resistance.

Another object of the invention is to provide piston rings having plasma jet applied alumina-titania or zirconia coatings.

A specific object of the invention is to provide an engine piston ring having an annular groove thereon filled with a layer of one of the above oxide coatings which have sufficient porosity to allow them to carry a lubricant.

Other objects, features and advantages of the invention will be readily apparent from the following description of certain preferred embodiments thereof, taken in conjunction with the accompanying drawings, all variations and modifications may be effected without departing from the spirit and scope of the novel concepts of the disclosure, and in which the following detailed description of the annexed sheet of drawings by way of preferred example illustrate several embodiments of the invention.

BRIEF DESCRIPTION OF THE DRAWINGS

FIG. 1 is a side elevational view, with parts in cross section, of an engine piston and cylinder assembly, wherein the piston has ring grooves equipped with compression and oil control rings each having a bearing face engaging the cylinder which is composed of in situ formed plasma jet applied coatings, according to this invention;

FIG. 2 is an enlarged fragmentary cross sectional view of the top compression ring in the piston on FIG. 1;

FIG. 3 is a view similar to FIG. 2, but illustrating the second compression ring in the piston of FIG. 1;

FIG. 4 is a view similar to FIG. 2, but illustrating the oil control ring in the third ring groove of the piston of FIG. 1;

FIG. 5 is a view similar to FIG. 2, but illustrating the oil control ring in the fourth ring groove of the piston of FIG. 1; and FIG. 6 is an elevational view of an arbor of piston rings being plasma jet coated in accordance with this invention.

DESCRIPTION OF THE PREFERRED EMBODIMENTS

The piston and cylinder assembly 10 of FIG. 1 illustrates generally a conventional 4-ring groove internal combustion engine piston, operating in an engine cylinder. The assembly 10 includes a piston 11 and an engine cylinder 12 with a bore 13, receiving the piston 11. The piston 11 has a head 14 with a ring band 15 having four peripheral ring grooves 16, 17, 18 and 19 therearound. The top ring groove 16 has a split solid cast iron compression or fire piston ring 20 therein. The second ring groove 17 has a split solid second compression ring 21 somewhat wider than the ring 20. The third ring groove 18 carries a two-piece oil control ring assembly 22. The fourth or bottom ring groove 19 carries a three-piece oil control ring assembly 23.

As shown in FIG. 2, the top compression or fire ring 20 has a main body 24 composed of cast iron, preferably nodular gray iron, with a carbon content of about 3-1/2 percent by weight. The outer periphery 25 of this ring is covered with a plasma jet applied zirconium oxide or titanium oxide-aluminum oxide coating 26.

As shown in FIG. 3, the second compression ring 21 has a main body 27 composed of the same type of cast iron as the body 24 of the ring 20. The outer periphery 28 of the body 27 is inclined upwardly and inwardly from the bottom edge of the ring, and a peripheral groove 29 is formed around this inclined periphery. The groove 29 is filled with either of the coatings 26.

As shown in FIG. 4, the oil control ring assembly 22 in the third ring groove 18 is composed of a one-piece flexible channel ring 30 and a sheet-metal expander ring 31, having legs extending into the channel for expanding the ring 30. The ring 30 and the expander are more fully described in the Donald J. Mayhew et al. U.S. Pat. No. 3,281,156.

The one-piece control ring 30 has a pair of axially spaced, radially projecting beads 32. The peripheries of these beads 32 are coated with the coating 26.

In FIG. 5, the oil control ring assembly 23 includes a resilient spacer-expander ring 33 supporting and expanding split thin rail rings 34. The assembly 33 is of the type disclosed in the Melvin W. Marien U.S. Pat. Nos. 3,133,341 and 3,133,739. The outer peripheries of the rail rings 34 are coated with the coating 26, according to this invention.

From the above description, it will be understood that the bearing faces of each of the compression and oil control rings 20, 21, 22 and 23 are coated with either one or the other coatings described in this invention. These bearing faces 26 ride on and sealingly engage the bore 13 of the engine cylinder 12, and the rings are compressed in the bore 13, so as to expand tightly against the bore wall, and maintain a good sealing sliding engagement therewith.

As shown in FIG. 6, the coatings 26 are applied on the rings as for example on the grooved rings 21 by stacking a plurality of the rings on an arbor 35, with the rings compressed so that their split ends will be in near abutment. The arbor clamping the stack of rings in their closed, contracted position may be mounted in a lathe and the peripheries of the rings machined to form the grooves 29 therearound. The outer peripheries of the rings 21 on the arbor are then coated with the coatings 26 from a plasma jet spray gun 36. The gun 36 includes an insulated casing such as Nylon 37, from which projects a rear electrode 38, the projection of which is adjustably controlled by a screw knob 39. The front face of the casing receives a front electrode 40. The casing 37 and electrode 40 are hollow and water-jacketed so that coolant may circulate therethrough from an inlet 41 to an outlet 42. Plasma jet gas is fed through an inlet 43 into the chamber provided by the casing 37 and the electrode 40 to flow around the electrode 38.

The front end of the electrode 40 provides a nozzle outlet 44 for the plasma flame and the ingredients to form the coating 26 are fed to this nozzle through a powder inlet 45, just in advance of the discharge outlet of the nozzle.

A plasma composed of ionized gas is produced by passing the plasma gas from the inlet 42 through an electric arc established between the electrodes 38 and 40. This plasma gas is non-oxidizing and may be composed of nitrogen and hydrogen with argon, or helium as a carrier. The plasma flame exuding from the nozzle 44 draws the powder therewith by aspiration and subjects the powder ingredients to high temperatures. The jet stream carries the ingredient or ingredients into the bottom of the groove 29 of each piston ring and fills the groove.

It is greatly preferred that the zirconium oxide or titanium oxide-aluminum oxide coatings be plasma jet applied in situ upon the bearing face of the piston ring as just noted. In the usual case the outer coatings are applied by coating the piston rings from a powder fed to a plasma jet stream.

In some instances it may be preferred to first apply a bond coat between the outer coating of zirconium oxide or titania-alumina coating. Preferred bond coats of this type include both molybdenum and nickel-aluminide. However, in any event, the hardness of the layers of multi-layer coatings are found to be the same as if each of the coatings had been applied by themselves. It should therefore be understood, of course, that satisfactory bondings with cast iron are obtained directly with the zirconium oxide or titania-alumina coatings without the use of a separate bond-coating material.

A typical underlying coating of nickel and aluminum includes 80–95 percent by weight of nickel, with the remainder being aluminum.

The coatings of the invention are applied via a plasma jet spray technique either by utilizing a zirconium oxide powder or a combination of titanium and aluminum oxides. Typically, a titania-alumina coating will comprise a 10–25 percent by weight of titanium oxide and 75–90 percent aluminum oxide. A specific coating will be comprised of 83 percent aluminum oxide and 17 percent titanium oxide.

The coatings here have excellent hardness. For example, the hardness of the zirconium oxide outer coating is a Vickers Hardness $(DPH)_{40}$ of at least 1,000 and more often ranges between about 1,300 and 1,600. In like manner, the hardness of the combined coating of titania and alumina is also quite adequate. The titania phase generally has a Vickers Hardness $(DPH)_{40}$ of 500–1500 in this phase. More often the hardness is 800–1,200. The alumina phase has a Vickers Hardness $(DPH)_{40}$ of 2,300–3,300 and more often falls within the range of about 2,500 and 3,000.

It should be noted here that both the zirconium oxide coating and the titanium oxide-aluminum oxide coating have excellent hardness and scuff-resistance as will be demonstrated hereinafter. Also, said coatings may be ground utilizing conventional techniques.

The following examples illustrate typical conditions utilized in spraying the coatings of the invention upon piston rings. In each instance, a plasma jet spray technique was utilized.

EXAMPLE I

Here a powder was sprayed upon an arbor of rings to produce a hard-faced coating. The specific coating in this example was comprised of 77 percent alumina and 13 percent titania with the aluminum and titanium being plasma jet sprayed as a powder mixture of oxides.

The following plasma application parameters were utilized in this run:

| | |
|---|---|
| Number of Guns | 1 |
| Gun-To-Work-distance | 4½" |
| Angle of Gun to Axis of Work | Compression Rings—45° |
| | Oil Rings—90° straight in. |
| Amperage D.C. | 500 |
| Voltage | 85 reference |
| Secondary Gas—Hydrogen | 15 Std. cubic ft./hour |
| Primary Gas | 75 Std. cubic ft./hour |
| Carrier Gas | 37 Std. cubic ft./hour |
| Rate of Vertical Feed | 24–32 inches/minute |
| Speed of Arbor Rotation | 60–90 RPM based on 4" arbor |

The spray is applied as shown in FIG. 6 until the rings are covered with the titanium oxide-aluminum coating.

EXAMPLE II

A zirconium oxide coating was plasma jet applied here by following the below variables with respect to the plasma jet technique.

| | |
|---|---|
| Number of Guns | 1 |
| Gun-To-Work Distance | 3¼–3¾" |
| Angle of Gun to Axis of Work | Compression rings—45° |
| | Oil Rings—90° |
| Amperage | 350–400 |
| Voltage | As observed. |
| Secondary Gas Flow—Hydrogen | 10–20 Std. Cu. ft./hr. (SCFH) |
| Primary Gas Flow—Nitrogen | 75–85 SCFH |
| Carrier Gas Flow—Nitrogen | 75–85 SCFH |
| Vertical Feed Rate | 14–20 in./min. |
| Arbor Speed | 60–90 RPM based on 4" arbor diameter. |

It has also been noted that the particle distribution size of the zirconium oxide powder utilized in the plasma jet spray technique is important particularly to achieve proper tensile strength. If the powder is too coarse the resultant coating has reduced strength and is not porous enough to retain oil. In some respects, the same is true with respect to the alumina-titania coating, although particle distribution with respect to this mixed coating is not as critical.

For best results, the zirconium oxide powder should have a particle distribution size of at least 50 percent by weight of less than 40 microns. Preferably at least 70 percent of the zirconium oxide powder should have a particle distribution size less than about 40 microns. For good abrasive wear-resistance, the alumina-titania powder will range from about 270 mesh up to about +15 microns.

A typically useful zirconia powder has the following sieve analysis:

TABLE I

| Size Range | % Fraction |
|---|---|
| −200 + 250 mesh | 2.0 |
| −250 + 350 mesh | 15.4 |
| −325 mesh + 50 microns | 4.0 |
| −50 + 40 microns | 34.1 |
| −40 + 30 microns | 12.6 |
| −30 + 25 microns | 16.6 |
| −25 + 20 microns | 10.1 |
| −20 + 15 microns | 3.1 |
| −15 + 10 microns | 2.1 |
| −10 microns | −0− |

In the following group of studies the zirconia and titania-alumina coatings were analyzed after application to piston rings with respect to grinding characteristics, hardness, oxidation resistance and engine test to obtain wear data.

EXAMPLE III

In this first series of tests, a piston ring was coated with a hard outer zirconia coating and underlying molybdenum coating. Another series of pistons were coated with an outer coating of 77 percent alumina and 13 percent titania. Both series of coatings could be ground using normal grinding practices.

EXAMPLE IV

The coatings of Example III were then tested for hardness. With respect to the zirconia-molybdenum coating the outer zirconia coating had a hardness of 1,592 Vickers $(DPH)_{40}$ and the underlying molybdenum coating had a hardness of 922. The coating comprising a blend of aluminum oxide and titanium oxide had a Vickers Hardness $(DPH)_{40}$ of 2,778.

EXAMPLE V

The coatings of Example III were then subjected to extensive heat treatment in order to indicate the degree of oxidation as measured by major color changes. Both coatings, when heated at 750° F. for 100 hours did not indicate any oxidation. In fact, the coating comprising aluminum oxide-titanium oxide did not indicate oxidation even when heated at 1,000° F. for 100 hours.

With respect to the above coatings, no significant hardness changes were observed on any of the coatings before and after heating to either 750° F. or 1,000° F. for the 100 hour period.

EXAMPLE VI

Still further testing was carried out with respect to piston rings having either a zirconium oxide coating or a blend of aluminum oxide and titanium oxide as a coating. In a porosity test, the zirconium oxide coating had a porosity of 10–15 percent and the blended coating a porosity of about 3 percent. The zirconium oxide coating had a melting temperature of 4,650° F. and the blend of aluminum oxide-titanium oxide coating had a melting temperature of about 3,500° F.

EXAMPLE VII

Both the zirconium oxide and alumina-titania coatings on piston rings were also subjected to engine tests in a Renault 70 mm test engine in order to determine wear characteristics. Both coatings were found to be acceptable and in many cases superior to conventional piston ring coatings.

Specifically, both end clearance change and bore wear data were obtained. With respect to the end clearance change the following procedure was carried out. The rings were first confined in a precise diameter gauge. In order to avoid a change in end clearance (E.C.) due to small changes in gauge diameter, the same gauge was used before and after the test. The end clearance between the two gap ends was then measured using a tool maker's microscope with a calibrated lens system. Thereafter, the rings were installed and the engine run in a specific test schedule for the prescribed length of time. After the test was completed the rings were removed from the engine, any carbon accumulation carefully removed, and the above measurement repeated. The difference between the two measurements in end clearance then is a measurement of wear.

With respect to the bore wear test, each bore was measured before the test at five locations in two directions at each location. Measurements were taken of the cylinder both lengthwise and across at the five locations from the top of the cylinder bore as follows:
1. At top of ring travel — approximately three-eighths inch
2. One inch from top
3. Two inches from top
4. Three inches from top
5. Four inches from top.

This procedure was then repeated after the test and the difference was calculated for each position.

Both coatings from a ring wear standpoint and a bore wear standpoint passed the above test, and in many instances were superior to conventional piston ring coatings with respect to wear characteristics. Data are given in Tables II and III.

TABLE II

Zirconium Oxide Coating

| Cylinder no. | | 1 | 2 | 3 | 4 |
|---|---|---|---|---|---|
| top ring | before | .023 | .022 | .023 | .024 |
| | after | .024 | .023 | .024 | .025 |
| | average change | .001 | .001 | .001 | .001 |
| 2nd ring | before | .024 | .024 | .023 | .024 |
| | after | .027 | .026 | .024 | .027 |
| | average change | .003 | .002 | .001 | .003 |

Bore Wear Test

| Cylinder no. | | 1 | 2 | 3 | 4 |
|---|---|---|---|---|---|
| | distance from top of cylinder | | | | |
| crosswise before | 3/8 | 2.7562 | 2.7563 | 2.7564 | 2.7558 |
| | 1 | 2.7562 | 2.7563 | 2.7563 | 2.7560 |
| | 2 | 2.7563 | 2.7563 | 2.7564 | 2.7564 |
| | 3 | 2.7565 | 2.7566 | 2.7566 | 2.7567 |
| | 4 | 2.7565 | 2.7566 | 2.7568 | 2.7567 |
| | average | 2.7564 | 2.7564 | 2.7565 | 2.7563 |
| crosswise after | 3/8 | 2.7595 | 2.7595 | 2.7582 | 2.7591 |
| | 1 | 2.7564 | 2.7563 | 2.7562 | 2.7562 |
| | 2 | 2.7562 | 2.7560 | 2.7561 | 2.7563 |
| | 3 | 2.7562 | 2.7560 | 2.7562 | 2.7563 |
| | 4 | 2.7557 | 2.7558 | 2.7560 | 2.7560 |
| | average | 2.7568 | 2.7567 | 2.7565 | 2.7568 |
| | average change | .0005 | .0003 | .0000 | .0005 |
| lengthwise before | 3/8 | 2.7567 | 2.7570 | 2.7570 | 2.7562 |
| | 1 | 2.7565 | 2.7568 | 2.7568 | 2.7564 |
| | 2 | 2.7565 | 2.7566 | 2.7567 | 2.7565 |
| | 3 | 2.7565 | 2.7566 | 2.7566 | 2.7567 |
| | 4 | 2.7560 | 2.7564 | 2.7565 | 2.7564 |
| | average | 2.7564 | 2.7567 | 2.7567 | 2.7565 |
| lengthwise after | 3/8 | 2.7586 | 2.7583 | 2.7584 | 2.7584 |
| | 1 | 2.7558 | 2.7568 | 2.7560 | 2.7554 |
| | 2 | 2.7557 | 2.7563 | 2.7562 | 2.7558 |
| | 3 | 2.7559 | 2.7564 | 2.7564 | 2.7562 |
| | 4 | 2.7562 | 2.7563 | 2.7562 | 2.7562 |
| | average | 2.7564 | 2.7568 | 2.7566 | 2.7564 |
| | average change | .0000 | .0001 | −.0001 | −.0001 |

TABLE III

Aluminum Oxide-Titanium Oxide Coating

| | Distance From top of cylinder | Cyl. No. 1 | Cyl. No. 2 | Cyl. No. 3 | Cyl. No. 4 |
|---|---|---|---|---|---|
| lengthwise before | 3/8 | 2.7559 | 2.7557 | 2.7570 | 2.7582 |
| | 1 | 2.7560 | 2.7560 | 2.7563 | 2.7576 |
| | 2 | 2.7564 | 2.7567 | 2.7561 | 2.7565 |
| | 3 | 2.7564 | 2.7569 | 2.7552 | 2.7560 |
| | 4 | 2.7564 | 2.7561 | 2.7549 | 2.7559 |
| | ave. | 2.7561 | 2.7561 | 2.7558 | 2.7567 |
| lengthwise after | 3/8 | 2.7563 | 2.7560 | 2.7564 | 2.7583 |
| | 1 | 2.7556 | 2.7554 | 2.7561 | 2.7573 |
| | 2 | 2.7560 | 2.7562 | 2.7556 | 2.7565 |
| | 3 | 2.7561 | 2.7566 | 2.7550 | 2.7558 |
| | 4 | 2.7551 | 2.7565 | 2.7549 | 2.7551 |
| | ave. | 2.7558 | 2.7561 | 2.7556 | 2.7570 |
| | ave. change | .0003 | .0000 | .0002 | .0003 |
| top ring | E. C. before | .0236 | .0222 | .0211 | .0224 |
| | E. C. after | .0255 | .0241 | .0238 | .0257 |
| | E. C. change | .0019 | .0019 | .0027 | .0033 |
| 2nd ring | E. C. before | .0240 | .0244 | .0240 | .0243 |
| | E. C. after | .0254 | .0263 | .0254 | .0265 |
| | E. C. change | .0014 | .0019 | .0014 | .0022 |
| | distance from top of cylinder | | | | |
| crosswise before | 3/8 | 2.7568 | 2.7571 | 2.7560 | 2.7562 |
| | 1 | 2.7568 | 2.7572 | 2.7564 | 2.7567 |
| | 2 | 2.7563 | 2.7570 | 2.7571 | 2.7573 |
| | 3 | 2.7560 | 2.7565 | 2.7572 | 2.7570 |
| | 4 | 2.7564 | 2.7560 | 2.7562 | 2.7570 |
| | ave. | 2.7565 | 2.7568 | 2.7566 | 2.7569 |
| crosswise after | 3/8 | 2.7572 | 2.7571 | 2.7557 | 2.7570 |
| | 1 | 2.7565 | 2.7571 | 2.7560 | 2.7568 |
| | 2 | 2.7560 | 2.7568 | 2.7567 | 2.7566 |
| | 3 | 2.7555 | 2.7580 | 2.7570 | 2.7566 |
| | 4 | 2.7556 | 2.7551 | 2.7563 | 2.7560 |
| | ave. | 2.7566 | 2.7564 | 2.7565 | 2.7561 |
| | ave. change | .0001 | .0004 | .0001 | .0008 |

SUMMARY

The present invention provides hard-faced piston rings having coatings of the zirconium oxide or alumina-titania type. The rings of the invention are preferably coated utilizing a plasma jet technique wherein said coatings are formed in situ on the ring. In addition to excellent hardness the coatings also exhibit superior scuff-resistance. Also, they can be finished by grinding on conventional silicon carbide and aluminum oxide grinding wheels.

We claim as our invention:

1. A piston ring having a bearing face coating of a hard scuff resisting material consisting essentially of a mixture of from about 10 to from about 25 percent by weight titanium oxide and from about 75 to about 90 percent by weight aluminum oxide, the titanium oxide being in a first phase and having a hardness of from about 500 to about 1,500 Vickers Hardness $(DPH)_{40}$, the aluminum oxide being in a second phase and having a hardness of from about 2,300 to about 3,300 Vickers Hardness $(DPH)_{40}$.

2. The piston ring of claim 1 further characterized in that the mixture is 17 percent by weight titanium oxide and 83 percent by weight aluminum oxide.

3. The piston ring of claim 1 further characterized in that there is a bond coat underlying the hard scuff resisting material, comprising nickel-aluminide.

4. The piston ring of claim 3 further characterized in that the bond coat comprises 80 to 95 percent by weight nickel with the remainder aluminum.

* * * * *